Aug. 29, 1961  G. R. GILBERT  2,998,467
PARAFFIN HYDROCARBON ISOMERIZATION CATALYST AND PROCESS
Filed Dec. 31, 1959
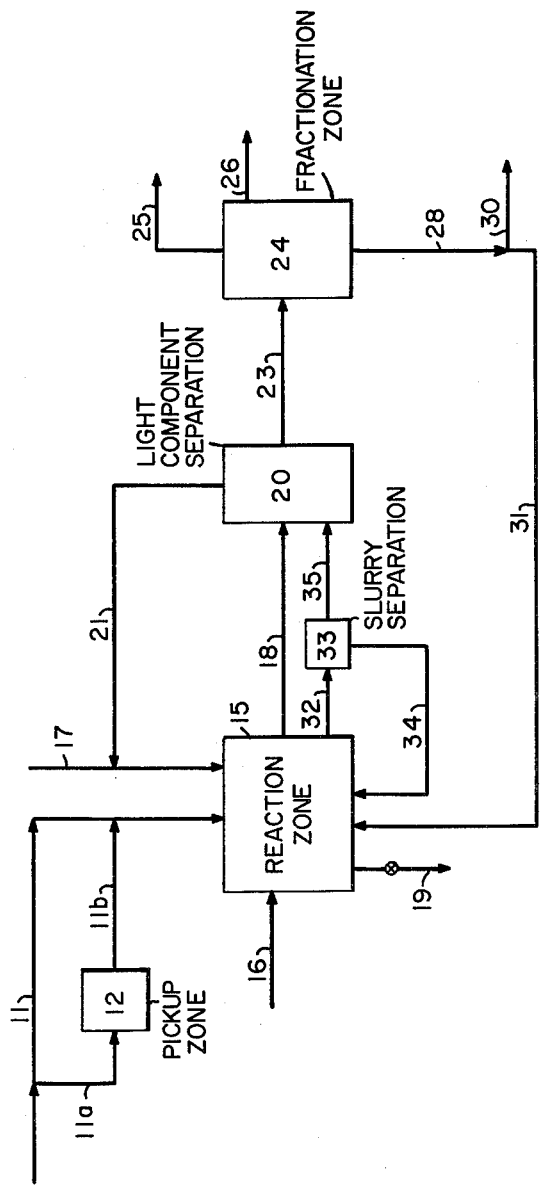
George R. Gilbert  Inventor
By  *Byron O. Dimmick*
Patent Attorney

2,998,467
PARAFFIN HYDROCARBON ISOMERIZATION CATALYST AND PROCESS

George R. Gilbert, Elizabeth, N.J., assignor to Esso Research and Engineering Company, a corporation of Delaware
Filed Dec. 31, 1959, Ser. No. 863,155
8 Claims. (Cl. 260—683.75)

This invention concerns improvements in the conversion of straight chain paraffin hydrocarbons into more desirable branched chain isomers. The invention is particularly directed to the liquid phase isomerization of $C_5$ to $C_7$ paraffin hydrocarbons using aluminum halide catalysts wherein the catalytic activity is promoted by the presence of certain rare earth metal oxides.

The highly branched isomers of paraffin hydrocarbons boiling in the gasoline range are much more valuable as motor fuel components than the corresponding slightly branched or straight chain hydrocarbons. This is because the more highly branched isomers have much higher antiknock ratings and are thus valuable constituents for the high octane rating motor fuels that are needed to supply the demands of modern high compression internal combustion engines. Among the processes that are available to the petroleum refiner for producing highly branched paraffin hydrocarbons one of the most attractive from an economic standpoint is that of subjecting the light naphtha fractions to an isomerization treatment.

The isomerization of normal paraffin hydrocarbons of from 4 to 7 carbon atoms into the corresponding branched chain homologs is well known. For effecting the isomerization, it is convenient to employ certain metal halides, particularly aluminum chloride or aluminum bromide, in conjunction with ceretain promoters, such as hydrogen chloride, hydrogen bromide or boron fluoride. Insofar as the isomerization of light naphthas is concerned, the lower the temperature of isomerization, within limits, the more favorable is the equilibrium for converting straight chain paraffin hydrocarbons into isomers of high octane rating. Aluminum bromide has been found to be more active than aluminum chloride at lower isomerization temperatures, e.g. in the range of about 40° to about 150° F.

Although, as stated, the lower isomerization temperatures that are possible when using aluminum bromide favor the production of high yields of isomers of high octane rating, the system is extremely sensitive to the occurrence of cracking, which can result in poor selectivity to the desired product and which can also cause a rapid decrease in the rate of isomerization. Frequently it is desired to employ promoters to enhance the activity of aluminum bromide in isomerization but this is often accompanied by additional cracking, particularly when isomerizing heptane. There is thus a need for materials that will promote the isomerization of aluminum halides and particularly of aluminum bromide without increasing cracking activity.

It is one object of the precent invention to provide a promoted aluminum halide system wherein there is little or no cracking activity when the system is employed for isomerizing paraffin hydrocarbons.

In accordance with the present invention it has been found that certain rare earth metal oxides are very effective promoters for aluminum halides and especially for aluminum bromide when the catalysts are employed for isomerizing paraffin hydrocarbons of from 5 to 7 carbon atoms. The promoted catalysts are particularly effective for isomerizing normal heptane with but only slight production of lighter hydrocarbons. The rare earth oxides that are used are those selected from the group consisting of cerium, lanthanum, didymium, and neodymium oxides.

Normally the rare earth oxides are used alone as the supports for the aluminum halides in the catalyst compositions. In certain cases they may be employed in conjunction with other supports or carriers such as activated carbon, activated alumina, silica gel, calcined bauxite and various activated clays. The proportion of aluminum halide to rare earth oxide may range from about 0.1 to 1 to about 3 to 1 by weight. A preferred range is from about 0.5 to 1 to about 2 to 1.

As set forth hereinafter, the process constituting the present invention consists in contacting normal paraffin hydrocarbons or slightly branched paraffin hydrocarbons of from 5 to 7 carbon atoms in the liquid phase at temperatures in the range of from about 40° to about 150° and preferably at temperatures in the range of about 60° to about 130° F., with a catalyst comprising an aluminum halide and a rare earth metal oxide. Preferably the aluminum halide comprises aluminum bromide. The process may be conducted either as a batch operation or as a continous operation, the latter being preferred for economic reasons. The apparatus employed is of a conventional nature and may comprise a tower containing a fixed bed of the catalyst through which the reacting hydrocarbons are circulated or it may comprise a tower adapted for a moving bed type of operation or a slurry operation. Preferably, when using aluminum bromide in addition to the amount associated with the rare earth oxide, some aluminum bromide is also dissolved in the reacting hydrocarbon.

It is desirable that the isomerization feed contain no more than a maximum of about 0.1% of aromatics. Benzene is present to the extent of 2 to 6 vol. percent in most naphthas but can be removed from the feed by solvent extraction, extractive distillation, hydrogenation or acid treating. Contacting the feed with an adsorbent, such as a molecular sieve zeolite of 13 A. port size, for example, may also be used. Pretreatment of the feed to reduce the sulfur content to less than 0.001 wt. percent is also desirable. While, as stated, the aromatics content should be low, naphthenes need not be removed. They are present up to 20 percent or more in many naphthas, and while they do suppress cracking to some extent, they do not do so completely; hence the need for the present invention.

The nature of the invention and the objects to be accomplished will be more clearly understood when reference is made to the accompanying drawing in which the single figure illustrates schematically a suitable arrangement of apparatus for conducting the process with aluminum bromide.

Referring now to the drawing, a feed stream comprising the hydrocarbon to be isomerized which may for example comprise a hexane or heptane fraction is conducted by means of line 11 into reaction zone 15. Since, as stated, it is desirable to have dissolved aluminum bromide in the reacting hydrocarbons and since this aluminum bromide will be removed from the reaction zone with the products, it is necessary to add make-up aluminum bromide to the reaction zone. This may be accomplished by diverting a portion of the feed stream by means of line 11a into a vessel 12 containing a body of aluminum bromide for the purpose of picking up a small portion of aluminum bromide in solution to be added with the feed stream. If the catalyst support in zone 15 is not initially saturated with aluminum bromide, a relatively large proportion or all of the feed stream may be initially sent through the pick-up zone 12 in order to introduce aluminum bromide into the reaction zone. After the support has become saturated with aluminum bromide, the proportion of the feed that is diverted into the pick-up vessel will be in the order of about 0.02 to about 0.5 wt. percent based on the fresh hydrocarbon feed.

It is sometimes desirable to employ isobutane as a cracking inhibitor when isomerizing paraffin hydrocarbons of from 5 to 7 carbon atoms. Preferably from about 25 to 100 volume percent of isobutane is used based on the higher paraffin hydrocarbon. If it is desired to introduce the isobutane as a separate stream, this may be done by means of line 16. Alternatively, the $C_5$ to $C_7$ paraffin hydrocarbon can be introduced via line 16 and the isobutane via line 11. The need for isobutane as an inhibitor is less when practicing the present invention than when using other catalysts since one of the advantages of the present catalysts is that little or no cracking occurs when they are used.

The reaction may be conducted in the presence of an added hydrogen halide promoter, preferably hydrogen bromide, which is introduced into the reaction zone by means of line 17. After the process is underway, a major proportion of the halide promoter will be obtained from recycle line 21 while only make-up promoter will enter through line 17. The promoter may be used in amounts ranging from about 0.1 to about 5 percent by weight, based on total feed. Conveniently the amount of hydrogen halide used may be self regulated by introducing it into the vapor space above the body of liquid in the reactor, the amount then entering into the reaction being that amount that will dissolve under the reaction conditions.

The feed is conducted through the reaction zone at rates of the order of 0.05 to 4.0 v./v./hr. Preferably the reaction temperature is in the range of from about 60° to about 130° F. and the pressure employed is sufficient to keep the reactants in the liquid phase. The conditions in the reaction zone are most desirably maintained so that no sludge formation occurs. However, should a small amount of sludge be formed it may be removed through line 19.

The reaction products together with dissolved aluminum bromide leave the reaction zone through line 18 and are conducted into an initial flash zone or light component separation zone 20 wherein conditions are maintained to remove the gaseous hydrogen halide promoter as well as an appreciable proportion of any lighter hydrocarbons that may be present. These materials are carried overhead through line 21 and returned to the reaction zone.

The flashed material is conducted by means of line 23 into fractionation zone 24 wherein the product is separated into desired fractions which can be removed overhead through line 25 or through a side stream 26. The bottoms from the distillation, which will contain dissolved aluminum bromide, are removed from distillation zone 24 by means of line 28 and recycled to the reaction zone through line 31. Since the feed stock may contain naphthene hydrocarbons, an appreciable proportion of these will be present in the bottoms leaving distillation zone 24. To prevent an undesirable build-up of naphthenes when recycling the bottoms, a portion may be bled off through line 30.

Although dissolved aluminum halide may be removed from the product by distillation as described, it may also be removed by percolating the product through an adsorbent such as bauxite, diatomaceous earth or charcoal, or by chilling the product to temperatures as low as —30° F. in a heat exchanger and separating the halide by filtration. To aid crystallization, a portion of the exit stream from the heat exchanger can be recycled to mix with the product stream going into the heat exchanger, thereby furnishing crystal nuclei for further crystallization. By employing two filters in parallel, operating alternately, the aluminum halide that accumulates on the filters can be recovered by passing warm feed through the filter not being used for catalyst removal.

The process has been described in connection with the drawing as a fixed bed operation. Alternatively, a moving bed operation could be employed. Still another alternative is a slurry type of operation. When a catalyst slurry is used, reaction zone 15 will be provided with suitable contacting equipment which may comprise a mechanical stirrer or a simple mixing pump together with baffle plates, mixing plates, or the like. The slurry of catalyst in reacted hydrocarbons is removed from the reaction zone by means of line 32 and sent to a separation zone 33 where the catalyst is separated from the hydrocarbons and returned to the reactor by means of line 34, while the product which is now free of immiscible catalyst but which still contains dissolved aluminum bromide is sent to zone 20 by means of line 35 to be handled in the manner previously described. Zone 33, wherein the slurry separation is made, may comprise a simple settling tank, a centrifuge or a filter, or suitable combinations of such equipment.

The benefits to be derived from the present invention will be appreciated from the following examples.

EXAMPLE 1

Several portions of a feed mixture each consisting of 160 cc. of isobutane, 38 cc. of normal heptane and 2 cc. of methylcyclohexane were contacted with various individual catalyst compositions comprising an aluminum halide and a rare earth oxide for periods of 4 hours at 70° F. At the end of the reaction period the products of the reaction were analyzed. The catalyst compositions and the results obtained in each of the runs are presented in Table I.

Table I

| Catalyst, gms.: | | | | | |
|---|---|---|---|---|---|
| $AlBr_3$ | 25 | 25 | 25 | | |
| $AlCl_3$ | | | | 25 | 25 |
| Didymium Oxide | 25 | | | | |
| Neodymium Oxide | | 25 | | 25 | |
| Rare Earth Oxides [1] | | | 25 | | 25 |
| HBr | 2 | 2 | 2 | | |
| HCl | | | | 2 | 2 |
| Analysis of $C_5$+Product, Wt. Percent: | | | | | |
| Total $C_5$ | 0.5 | 0.1 | 1.1 | 0.2 | 0.2 |
| Total $C_6$ | 0.6 | 0.5 | 0.8 | 0.1 | 0.0 |
| 2,2 DMP; 2,4 DMP | 21.5 | 10.2 | 30.2 | 3.4 | 6.6 |
| 2,2,3 TMB (Triptane) | 2.9 | 1.5 | 6.1 | 0.1 | 1.4 |
| 2,3 DMP; 3,3 DMP; CH 2 MH; 3 MH | 48.1 | 33.5 | 52.2 | 25.9 | 33.3 |
| 3 EP | 0.0 | 0.6 | 0.8 | 0.5 | 0 |
| MCH | 2.7 | 4.1 | 3.6 | 4.9 | 4.1 |
| $nC_7$ | 23.7 | 49.1 | 5.4 | 65.0 | 54.4 |
| Total $C_7$ | 98 | 98 | 98 | 99.7 | 99.8 |

[1] Approximate Analysis, Wt. Percent:
$La_2O_3$ ---- 24
$CeO_2$ ---- 48
$Pr_6O_{11}$ ---- 6
$Nd_2O_3$ ---- 19
$Sm_2O_3$ ---- 2
$Gd_2O_3$ ---- 0.7
Others+$Y_2O_3$ ---- 0.2

The following abbreviations are used in the above table:

DMP—Dimethyl pentane
TMB—Trimethyl butane
CH—Cyclohexane
MH—Methylhexane
EP—Ethyl pentane
MCH—Methyl cyclohexane It will be noted, from the results obtained, that the rare earth oxides were much more active promoters for aluminum bromide than they were for aluminum chloride. Neodymium oxide was less effective than didymium oxide or the rare earth oxide mixture, of which cerium oxide and lanthanum oxide were the predominating constituents, as a catalyst promoter or support.

EXAMPLE 2

Several portions of a feed mixture, each consisting of 94.5 grams of normal heptane and 5.5 grams of methylcyclohexane, were contacted with various catalytic compositions, comprising $AlBr_3$ and the oxides of this invention for periods of up to 6 hours at about 70° F. For comparison, a Porocel-AlBr₃ catalyst composition was run under the same conditions. An atmosphere of HBr gas was imposed in the reactor space above the slurry so that the gas could dissolve in the reacting mixture. Small samples of the hydrocarbon layer were withdrawn at intervals during the runs to determine conversions and selectivities to the isomers of heptane, as each run progressed. The catalyst compositions and the selectivities to the isomers of normal heptane at various normal heptane conversion levels are presented in Table II.

Table II

| Catalyst, grams: | | | | |
|---|---|---|---|---|
| AlBr₃ | 12.5 | 12.5 | 12.5 | 12.5 |
| Porocel | 12.5 | 0 | 0 | 0 |
| Rare Earth Oxides | 0 | 12.5 | 0 | 0 |
| Ce₂O₃ | 0 | 0 | 12.5 | 0 |
| La₂O₃ | 0 | 0 | 0 | 12.5 |
| | Selectivity to C₇ isomers (ex normal C₇) | | | |
| Conversion of nC₇, wt. percent: | | | | |
| 20 | 93 | 98 | 98 | 100 |
| 30 | 86 | 93 | 94 | 99 |
| 40 | 78 | 82 | 85 | 97 |
| 50 | 69 | 61 | 74 | 94 |

The data in Table II establish that the rare earth oxides of the present invention are more effective as promoters or supports for aluminum bromide isomerization catalyst than the conventional support, which is calcined bauxite (Porocel). Lanthanum oxide is seen to be the most active of the rare earth oxides tested.

It is not intended that this invention be limited to the specific examples herein presented, nor by any theory regarding its operation. The scope of the invention is defined by the claims appended hereto.

What is claimed is:

1. A process for converting a paraffin hydrocarbon of from 5 to 7 carbon atoms to a more highly branched isomer which comprises contacting said hydrocarbon in the liquid phase with a catalyst comprising an aluminum halide and a rare earth oxide selected from the class consisting of lanthanum oxide, cerium oxide, neodymium oxide and didymium oxide, at temperatures in the range of from 40° to 150° F.

2. Process as defined by claim 1 wherein said aluminum halide comprises aluminum bromide.

3. Process as defined by claim 1 wherein the proportion of said aluminum halide to said rare earth oxide is in the range of from about 0.1 to 1 to about 3 to 1 by weight.

4. Process as defined by claim 1 wherein said reaction is promoted with a hydrogen halide.

5. An isomerization catalyst comprising a mixture of an aluminum halide and a rare earth oxide selected from the class consisting of lanthanum oxide, cerium oxide, neodymium oxide, and didymium oxide.

6. Process as defined by claim 1 wherein said aluminum halide comprises aluminum chloride.

7. The process as defined by claim 1 wherein said catalyst contains lanthanum oxide.

8. The catalyst as defined by claim 5 wherein said oxide is lanthanum oxide.

References Cited in the file of this patent

UNITED STATES PATENTS

| 2,388,081 | Robertson | Oct. 30, 1945 |
| 2,399,354 | Kellett et al. | Apr. 30, 1946 |